(12) United States Patent
Segura Garcia et al.

(10) Patent No.: US 12,487,388 B2
(45) Date of Patent: Dec. 2, 2025

(54) OPTICAL BAND-PASS FILTER WITH BLOCKED SIDEBANDS

(71) Applicant: UNIVERSITAT POLITECNICA DE CATALUNYA, Barcelona (ES)

(72) Inventors: Daniel Segura Garcia, Barcelona (ES); David Cardador Maza, Barcelona (ES); Jordi Llorca Pique, Barcelona (ES)

( * ) Notice: Subject to any disclaimer, the term of this patent is extended or adjusted under 35 U.S.C. 154(b) by 435 days.

(21) Appl. No.: 18/014,407

(22) PCT Filed: Jul. 10, 2020

(86) PCT No.: PCT/ES2020/070446
§ 371 (c)(1),
(2) Date: Jan. 4, 2023

(87) PCT Pub. No.: WO2022/008764
PCT Pub. Date: Jan. 13, 2022

(65) Prior Publication Data
US 2023/0258852 A1    Aug. 17, 2023

(51) Int. Cl.
G02B 5/20 (2006.01)
B82Y 20/00 (2011.01)
C01B 33/02 (2006.01)
G02B 1/00 (2006.01)
G02B 1/02 (2006.01)
G02B 1/118 (2015.01)
G02B 5/28 (2006.01)

(52) U.S. Cl.
CPC .............. *G02B 5/207* (2013.01); *C01B 33/02* (2013.01); *G02B 1/005* (2013.01); *G02B 5/208* (2013.01); *B82Y 20/00* (2013.01); *G02B 1/02* (2013.01); *G02B 1/118* (2013.01); *G02B 5/288* (2013.01)

(58) Field of Classification Search
None
See application file for complete search history.

(56) References Cited

U.S. PATENT DOCUMENTS

| 7,135,120 B2 * | 11/2006 | Kochergin | .......... G03F 7/70958 |
| | | | 216/24 |
| 2004/0134879 A1 * | 7/2004 | Kochergin | .......... G02B 6/1225 |
| | | | 216/24 |

OTHER PUBLICATIONS

Wehrspohn, R. B., Schweizer, S. L., Gesemann, B., Pergande, D., Geppert, T. M., Moretton, S., & Lambrecht, A. (2013). Macroporous silicon and its application in sensing. Comptes Rendus Chimie, 16(1), 51-58.

(Continued)

*Primary Examiner* — Derek S. Chapel
(74) *Attorney, Agent, or Firm* — Eugenio J. Torres-Oyola; Victor M. Rodriguez-Reyes; Rafael Rodriguez-Muriel

(57) ABSTRACT

The present invention proposes an optical band-pass filter with blocked sidebands. The filter comprises a photonic crystal structure based on macroporous silicon having a series of pores defined in the structure. The photonic crystal structure includes a resonator block (BR), comprising at least two periodicity groups (GR1, GR2) between which there is a resonant cavity (CR), wherein the resonant cavity (CR) is adapted to provide a resonance peak in the center of a non-transmitting frequency band of the resonator block (BR); and at least one of a high-pass block (BPA), adapted to block wavelengths below said non-transmitting frequency band; or a low-pass block (BPB), adapted to block wavelengths above said non-transmitting frequency band.

16 Claims, 5 Drawing Sheets

(56) References Cited

OTHER PUBLICATIONS

Maza, D. C., Garcia, D. S., Deriziotis, I., Rodriguez, A., & Llorca, J. (2019). Macroporous Silicon Filters, a Versatile Platform for NDIR Spectroscopic Gas Sensing in the MIR. Journal of The Electrochemical Society, 166(12), B1010-B1015.

García, D. S., Cardador, D., Vega, D., Santos, M., Dios, F., & Rodriguez, A. (2018). Bandgap widening in macroporous silicon photonic crystals by multiperiodic structures. Journal of Physics Communications, 2(5), 055014.

Maza, D. C., Garcia, D. S., Deriziotis, I., Garín, M., Llorca, J., & Rodriguez, A. (2019). Empirical demonstration of $CO_2$ detection using macroporous silicon photonic crystals as selective thermal emitters. Optics letters, 44(18), 4535-4538.

Macleod, H. A. (2017). Thin-film optical filters. CRC press.

Cardador, D., Segura, D., & Rodríguez, A. (2018). Photonic molecules for improving the optical response of macroporous silicon photonic crystals for gas sensing purposes. Optics express, 26(4), 4621-4630.

Ghulinyan M et al.. Free-standing porous silicon single and multiple optical cavities. Journal of Applied Physics, American Institute of Physics, US., Jun. 15, 2003, vol. 93, No. 12, pp. 9724-9729, ISSN 0021-8979.

Lorenzo E; et al. Porous silicon-based rugate filters. Applied Optics, 20050910 Optical Society Of America, Washington, DC, US, Oct. 9, 2005, vol. 44, No. 26, pp. 5415-5420, ISSN 0003-6935.

Schilling J; Müller F; Matthias S; Wehrspohn R B; Gösele U; Busch K. Three-dimensional photonic crystals based on macroporous silicon with modulated pore diameter. Applied Physics Letters, 20010226 A I P Publishing, US, Feb. 26, 2001, vol. 78 , No. 9, pp. 1180-1182, ISSN 0003-6951.

Moayedfar M; Assadi M K. Various types of anti-reflective coatings (arcs) based on the layer composition and surface topography: a review. Reviews on Advanced Materials Science 2018 Advanced Study Center Russia, vol. 53, No. 2, pp. 187-205, ISSN SSN 1605-8127.

* cited by examiner

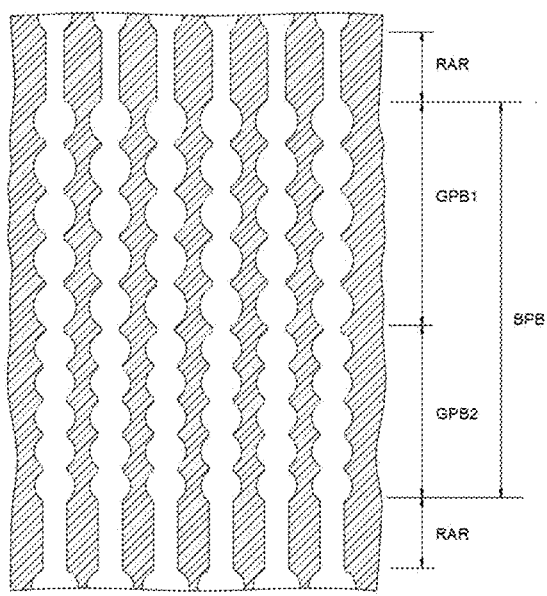
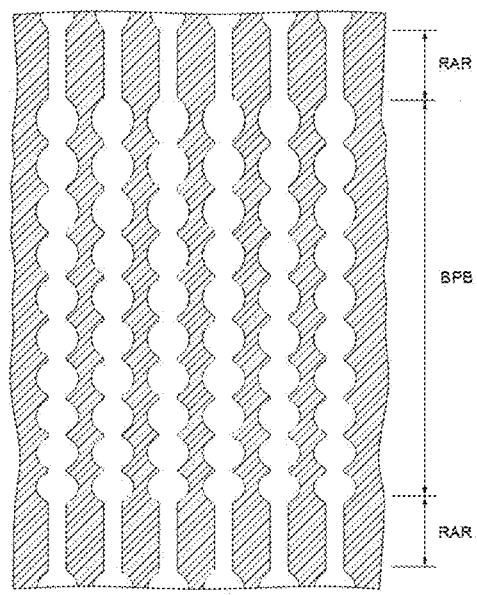
Fig. 6A          Fig. 6B
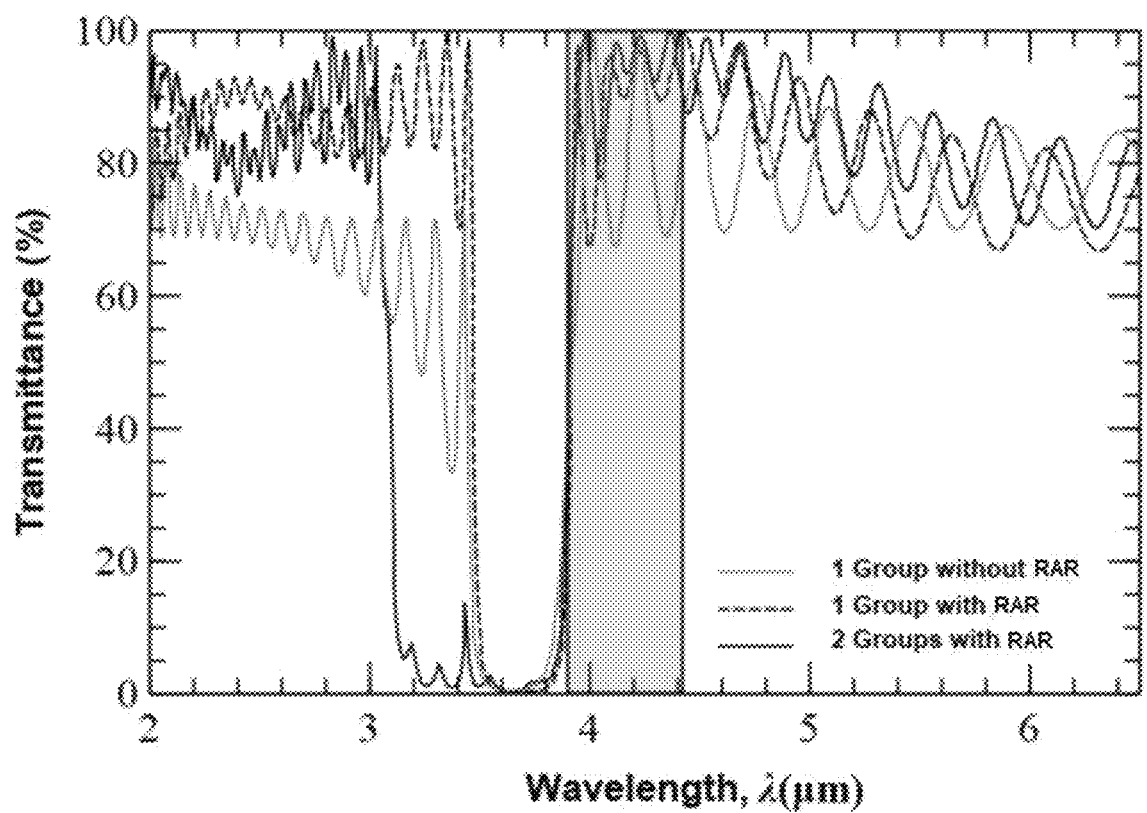
Fig. 7

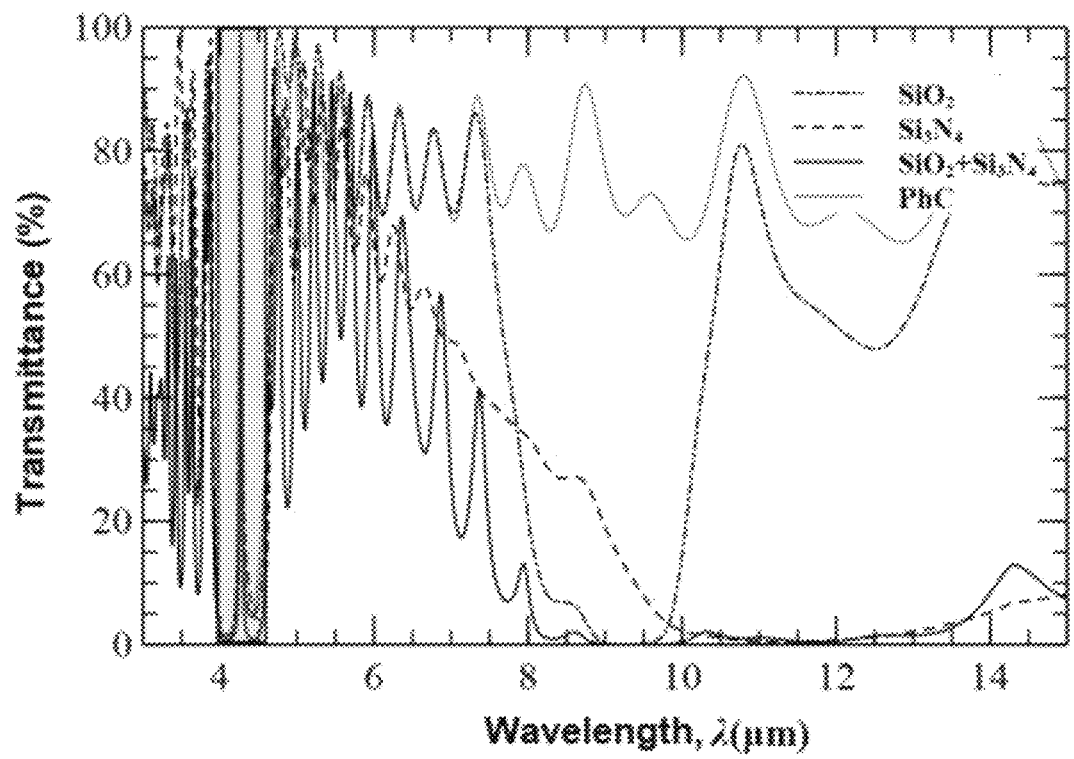
Fig. 10
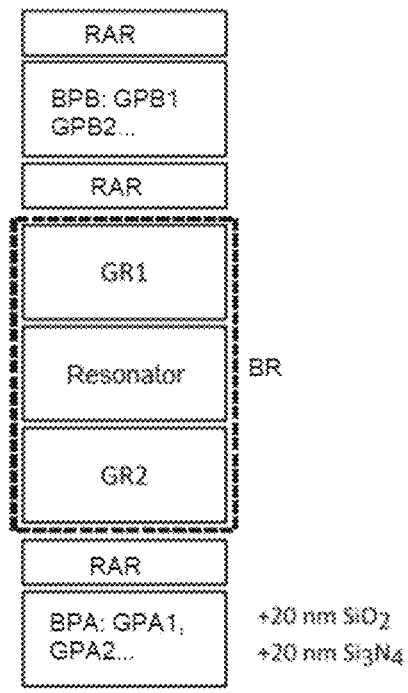 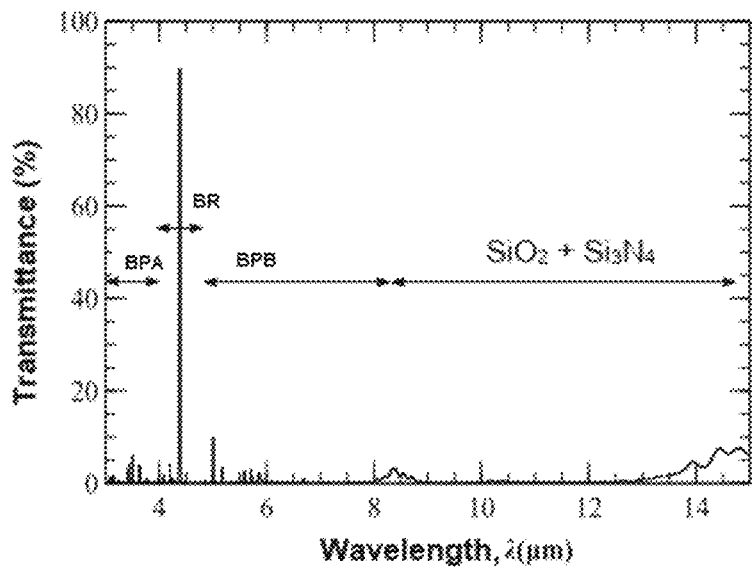
Fig. 11A                Fig. 11B

OPTICAL BAND-PASS FILTER WITH BLOCKED SIDEBANDS

TECHNICAL FIELD

The present invention relates to an optical band-pass filter with blocked or removed sidebands in the infrared (IR) band. The filter is obtained using macroporous silicon technology, manufactured by means of the electrochemical etching process.

BACKGROUND OF THE INVENTION

From documents [1-4], the use of macroporous silicon for filtering or emitting light in the infrared is already known. However, these documents do not describe the possibility of being able to remove the filter or emitter sidebands generated by the multiple resonances of the light within the structure. These bands greatly limit their introduction onto the market.

Document [2] describes the operation of a resonator block which consists of two periodicity groups (set of modulations arranged in series and with one and the same period) between which there is a resonant cavity. The periodicity groups block the transmission of a range of wavelengths, hereafter referred to as the non-transmitting frequency band or bandgap, and the resonant cavity enables the transmission of a narrow range of wavelengths within the bandgap, hereafter referred to as the resonance peak. In this case the bandgap is usually in the order of a micron, with much of the infrared transmission/emission still remaining unblocked. This transmission/emission, or sidebands because they occur in both bands of the bandgap, is represented in the resonator block curve in FIG. 2.

Document [3] describes the use of periodicity groups to increase the bandgap. The objective of this study is to obtain a bandgap wide enough to cover the emission spectrum of a light emitting diode (LED) and does not focus on blocking the sidebands of the rest of the mid-infrared. In this case, different periodicity groups are concatenated with different periods. As a result, the bandgap increases due to the overlap of the bandgaps associated with each periodicity group. However, if a resonant cavity is inserted in the middle of structures of this type, with multiple concatenated periodicity groups, the transmission of the resulting peak decays with respect to the structure of reference [2], because the light experiences a higher reflection in the resonator groups before penetrating the resonant cavity. In summary, wide bandgaps without transmission regions, or transmission regions with a very narrow bandgap, are obtained with this method. The fact that the resonance peak has a very low transmission, with bandgaps of more than one micron, makes this method not applicable for the purpose of the present invention. Something similar would apply to document [6] in which there is a concatenation of resonator blocks and bandgap increase is reported. In this case, the bandgap increase is also reduced and does not allow for removing sidebands. Likewise, the physical process used for bandgap increase, which is based on the coupling/decoupling of resonant cavities, is also different from that reported in the present invention.

Likewise, patent U.S. Pat. No. 7,628,906-B2 provides a method of manufacturing optical spectral filters with omnidirectional properties in the visible, near IR, mid IR and/or far IR spectral ranges by electrochemically etching a semiconductor wafer to form an array of pores that form silicon islands. These silicon islands act as independent waveguides the guided modes of which do not interfere between the different islands. The processing of said porous semiconductor wafer optimizes the filtering properties of said material. The spectral filter comprises a porous semiconductor wafer having pores which are regularly and strategically arranged forming said silicon islands and which may be coherently modulated in at least part of their depths. In addition, the confinement of guided modes in the silicon islands can be improved by depositing materials with a refractive index lower than that of silicon and/or with metals and with an antireflective deposit covering the first, second or both surfaces of the pores. This US patent works in the waveguide regime and not in coupled porous structures, where the effective refractive index regime applies, as in the case of the present invention. Moreover, sideband filtering is not described, among other aspects because the possibility of waveguide modulation is very limited due to the structure adopted by the pores to form the silicon islands.

REFERENCES

[1] Wehrspohn, R. B., Schweizer, S. L., Gesemann, B., Pergande, D., Geppert, T. M., Moretton, S., & Lambrecht, A. (2013). Macroporous silicon and its application in sensing. *Comptes Rendus Chimie*, 16 (1), 51-58.

[2] Maza, D. C., Garcia, D. S., Deriziotis, I., Rodriguez, A., & Llorca, J. (2019). Macroporous Silicon Filters, a Versatile Platform for NDIR Spectroscopic Gas Sensing in the MIR. *Journal of The Electrochemical Society*, 166 (12), B1010-B1015.

[3] García, D. S., Cardador, D., Vega, D., Santos, M., Dios, F., & Rodriguez, A. (2018). Bandgap widening in macroporous silicon photonic crystals by multiperiodic structures. *Journal of Physics Communications*, 2 (5), 055014.

[4] Maza, D. C., Garcia, D. S., Deriziotis, I., Garín, M., Llorca, J., & Rodriguez, A. (2019). Empirical demonstration of $CO_2$ detection using macroporous silicon photonic crystals as selective thermal emitters. *Optics letters*, 44(18), 4535-4538.

[5] Macleod, H. A. (2017). *Thin-film optical filters*. CRC press.

[6] Cardador, D., Segura, D., & Rodríguez, A. (2018). Photonic molecules for improving the optical response of macroporous silicon photonic crystals for gas sensing purposes. *Optics express*, 26(4), 4621-4630.

DISCLOSURE OF THE INVENTION

According to a first aspect, the present invention provides an optical band-pass filter with blocked or removed sidebands in the infrared.

The filter comprises a photonic crystal structure based on macroporous silicon having a series of pores, for example, defined periodically, in the structure. Likewise, the photonic crystal structure includes: a resonator block, comprising at least two periodicity groups between which there is a resonant cavity, wherein the resonant cavity is adapted to provide a resonance peak in the center of a non-transmitting frequency band, or bandgap, of the resonator block. In the same way, the photonic crystal structure includes at least one of: a high-pass block, adapted to block wavelengths below said non-transmitting frequency band; or a low-pass block, adapted to block wavelengths above said non-transmitting frequency band.

The optical response of the photonic crystal structure cannot be individualized in waveguides, but works in the effective refractive index regime, where the incident light does not see waveguides with specific indices but an effective refractive index, following the Maxwell-Garnett approximation.

In an embodiment, the photonic crystal structure comprises a low-pass block and a high-pass block.

The photonic crystal structure can be of the one-dimensional or three-dimensional type. Likewise, the arrangement of the resonator block, high-pass block, and/or low-pass block in the photonic crystal structure is interchangeable.

In an embodiment, the low-pass block and/or the high-pass block each comprises at least two periodicity groups the individual non-transmitting frequency bands of which overlap. In this case, each of the periodicity groups can have a number of periods ranging between 3 and 30 modulations.

In an embodiment, the periods of the periodicity groups of the high-pass block are shorter than the periods of the periodicity groups of the low-pass block.

In an embodiment, the photonic crystal structure further comprises an antireflective layer or region located above each resonator block, high-pass block, and low-pass block. In other embodiments, the photonic crystal structure includes only an antireflective layer located at the beginning of the structure, at the air/silicon interface, or on one of the blocks. The antireflective layer particularly comprises an optical length of an odd multiple of $\lambda/4$.

In an embodiment, the antireflective layer/region located at the air/silicon interface of the photonic crystal structure comprises a topology with a straight cylinder-shaped profile of radius R or a cone-shaped profile, the initial radius R of which is larger than the radius of the first modulation and decreases following a linear or quadratic trend.

The antireflective layer(s) located between other blocks particularly comprise(s) a topology with a straight cylinder-shaped profile of radius R, with a transition zone at each end of said straight cylinder. In other embodiments, the layer(s) can comprise a topology with a cone- or reverse cone-shaped profile.

In an embodiment, the pores include an internal coating of an absorbent material. For example, the absorbent material can be made of $TiO_2$, $SiO_2$ or $Si_3N_4$, among others. The internal coating particularly has a thickness of less than 0.2p, where p is the minimum separation between attached pore centers.

In an embodiment, the arrangement of the resonator block, high-pass block, and/or low-pass block in the photonic crystal structure is interchangeable.

In an embodiment, the resonant cavity consists of a resonator of an optical length of an odd multiple of $\lambda/4$.

BRIEF DESCRIPTION OF THE DRAWINGS

The foregoing and other features and advantages will be more fully understood from the following merely illustrative and non-limiting detailed description of the embodiments, in reference to the attached drawings in which:

FIGS. 6A and 6B schematically illustrate a block for blocking bands. FIG. 6A, configuration with 2 periodicity groups; FIG. 6B, configuration with a decreasing period.

FIG. 7 shows the photonic crystal with a high-pass block. The region of interest, where maximum transmittance/emissivity is desired, has been shaded in. Comparison of structures with and without RAR, as well as RAR with 1 and 2 periodicity groups.

FIG. 10 shows the optical response of the photonic crystal with layers of thin absorbent coatings for removing bands.

FIGS. 11A and 11B illustrate the photonic crystal based on macroporous silicon in a selective band-pass filter/emitter configuration. FIG. 11A, block diagram. FIG. 11B, example of the optical response.

DETAILED DESCRIPTION OF THE INVENTION AND OF THE EMBODIMENTS

Figures 2A, 2B:
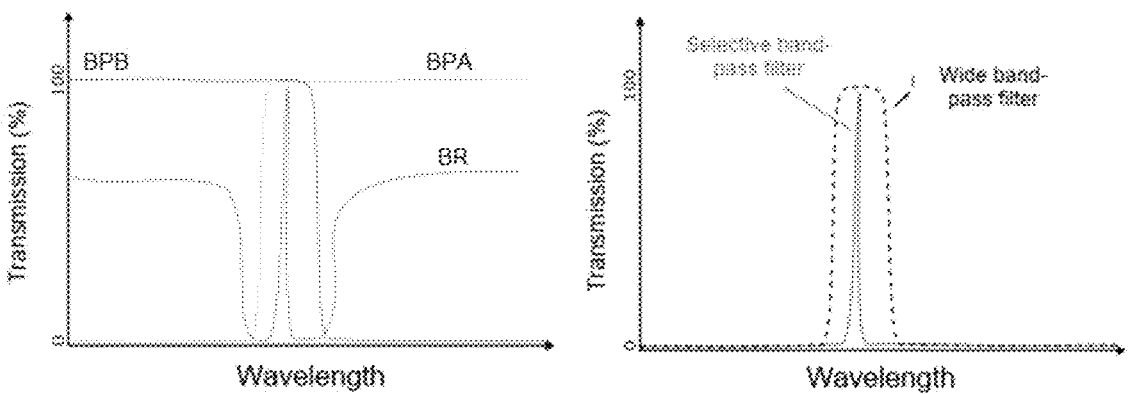
FIG. 2A illustrates the optical behavior of the different blocks that are part of the filter of FIG. 1.
FIG. 2B illustrates the response obtained with the resonator block (selective band-pass filter/emitter) and without a resonator block (broad band-pass filter/emitter).

The present invention proposes two types of band-pass filters, the wide ones and the selective ones. As can be seen in FIG. 2B, the difference resides in the amplitude of the high transmission zone, defined by the number of resonant cavities in the resonator block. Likewise, the present invention also discloses the use of said structures of macroporous silicon for emission in the infrared, without sidebands and with a high emissivity in both modalities, that is, selective emission and wide emission.

The invention is based on the use of macroporous silicon technology to manufacture band-pass filters with low transmission in the infrared except in the desired region by means of the photoelectrochemical etching technique. The proposed filter is based on a concatenation of blocks, each with a specific function, the order of which in the photonic crystal structure can be modified. The structures can be both three-dimensional and one-dimensional.

Figure 1:
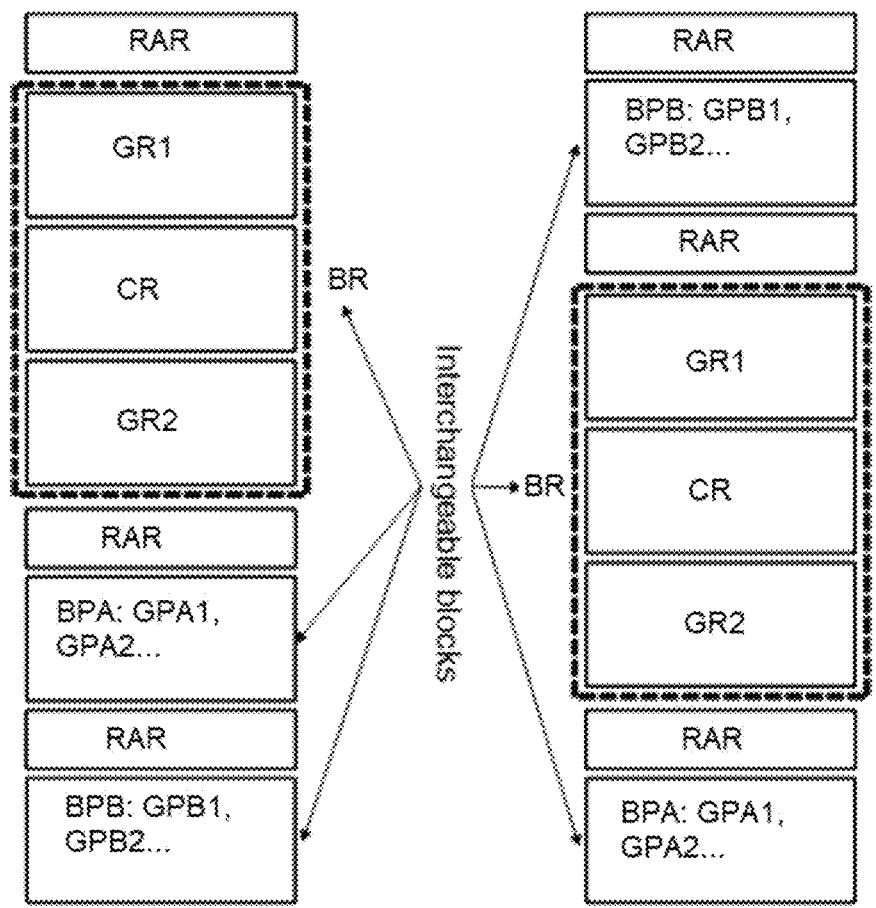
FIG. 1 illustrates two possible configurations of the different blocks that can form the band-pass filter with blocked sidebands, according to an embodiment of the present invention.

FIG. 1 shows an embodiment of the proposed filter. More particularly, FIG. 1 illustrates two possible configurations of the different blocks that can form the proposed filter. According to this embodiment, the photonic crystal structure of the filter comprises: a resonator block BR, a high-pass block BPA, a low-pass block BPB, and an antireflective layer RAR located above each resonator block BR, high-pass block BPA, and low-pass block BPB. It should be noted that in other embodiments, in this case not illustrated, the filter can only comprise, together with the resonator block BR, a high-pass block BPA or a low-pass block BPB. Likewise, in other embodiments, the filter only comprises an antireflective layer located at the air/silicon interface, or on one of the blocks BR, BPA or BPB.

The resonator block BR includes two periodicity groups GR1, GR2 and a resonant cavity CR between same. The resonant cavity CR provides a resonance peak in the center of a non-transmitting frequency band, or bandgap, of the resonator block BR.

The high-pass block BPA blocks the wavelengths below the bandgap. The low-pass block BPB blocks the wavelengths above the bandgap.

The different blocks BR, BPA, BPB can be combined with the antireflective layers or regions RAR. These layers RAR are manufactured using the same pores grown by means of electrochemical etching. The layers RAR connect both the air/first block interface and also the interfaces between blocks. Their function is to remove strong reflections arising due to the variation of effective refractive indices.

Pore modulation shall particularly be such that by calculating the effective refractive index thereof, the contrast between the maximum and the minimum, $n_{ef\_high}/n_{ef\_low}$, is greater than 1.05. One embodiment would be a spherical, pear, or square shape.

In some embodiments, the pores can include an internal coating of an absorbent material, such as $TiO_2$, $SiO_2$, or $Si_3N_4$, among others. This internal coating successfully removes bands due to the intrinsic absorption mechanism of the materials used. The use thereof is based on the effectiveness of the porous structure in maximizing the interaction between light and matter, so the thicknesses of the layers are much lower than those normally used in other technologies [5].

The different blocks/parts that may be included in the filter are described below in greater detail, starting with the first air/photonic crystal interface.

Antireflective Region:

The antireflective layers RAR particularly consist of a region the optical length of which is an odd multiple of $\lambda/4$, where $\lambda$ is the center wavelength of the band-pass filter. The antireflective layers RAR can be applied both to the interface between air/first block and between blocks.

Figures 3A, 3B:
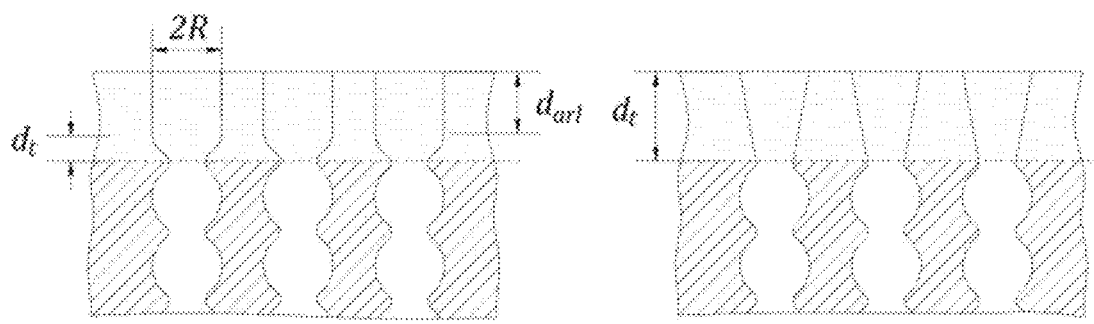
FIGS. 3A and 3B show different configurations of the antireflective block (dotted zone) for the air/photonic crystal interface, according to embodiments of the present invention.

When the antireflective layer RAR is located at the air/silicon interface, it can have different topologies. FIG. 3A shows a first topology formed by a straight cylinder of radius (R). FIG. 3B shows the second topology formed by a cone-shaped profile, the initial radius R of which will be larger than the radius of the first modulation and will decrease following a linear or quadratic trend.

Figure 4:
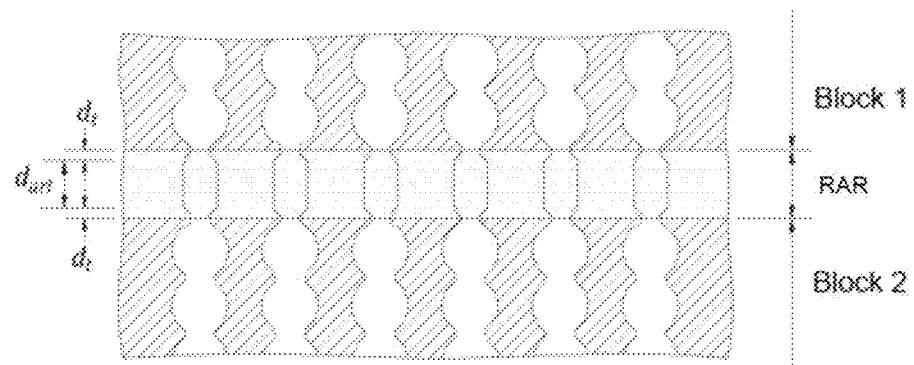
FIG. 4 shows another configuration of the antireflective block between blocks (dotted zone), according to an embodiment of the present invention.

In the case of antireflective layers RAR between blocks, particularly the first topology will be used, but two transition regions will be considered, as can be seen in FIG. 4.

There are described radii the values of which are in the range 0.05p<R<0.48p, where p is the minimum separation between attached pore centers. The length of the antireflective layers RAR, d, takes a range of values between:

$$0.75 \cdot \frac{m \cdot \lambda}{4 \cdot n_{eff}} < d < 1.25 \cdot \frac{m \cdot \lambda}{4 \cdot n_{eff}}, \text{ where } m = 1, 3, 5, 7, \text{ or } 9$$

Where $n_{eff}$ is the effective refractive index of the antireflective layers RAR. In the case of a square distribution of pores, the effective refractive index is:

$$n_{eff} = \frac{\pi R^2}{\Lambda^2}(n_m - n_{si} + \Lambda^2 \cdot n_{si})$$

Where $n_m$ is the refractive index of the medium for which the filter is designed, typically air; $n_{si}$ is the refractive index of silicon for $\lambda$; $\Lambda$ is the horizontal period of the square pattern, in this case $\Lambda=p$.

For the antireflective layers RAR at the air/silicon interface $d=d_{arl}+d_r$, whereas for the antireflective layers RAR located between blocks $d=d_{arl}+2d_r$.

Figure 5:
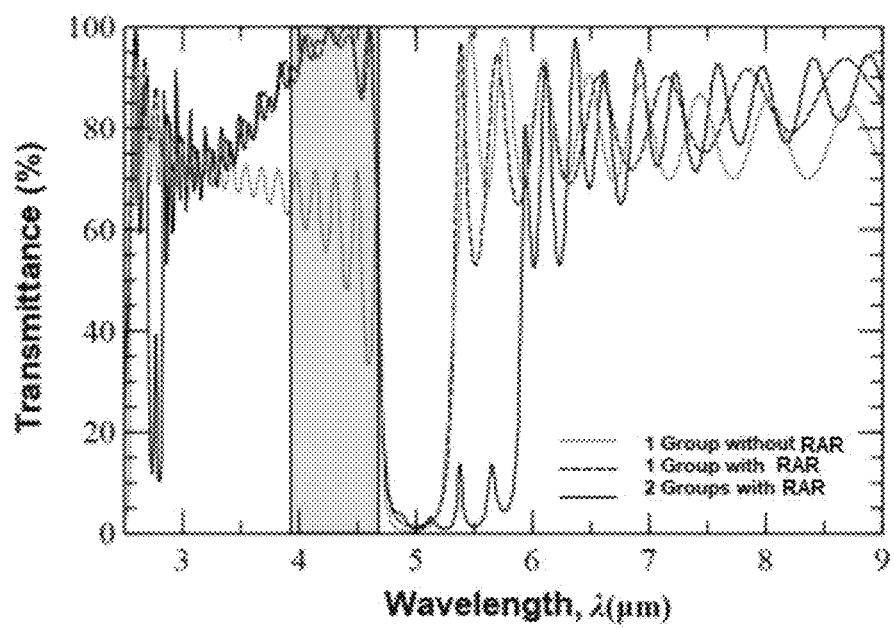
FIG. 5 shows the photonic crystal with a low-pass block. The region of interest, where maximum transmittance/emissivity is desired, has been shaded in. Comparison of structures with and without RAR, as well as RAR with 1 and 2 periodicity groups.
Figure 8:
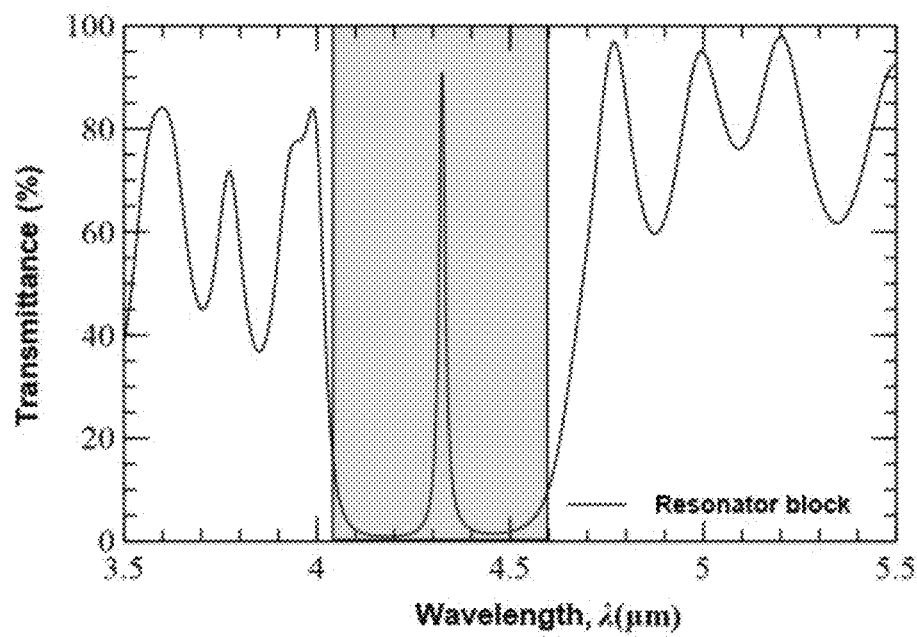
FIG. 8 shows the photonic crystal as a resonator block. The region of interest, where maximum transmittance/emissivity is desired, has been shaded.

Low-Pass Block:

This block is in charge of blocking wavelengths that are higher than those of the region of interest. In the case of manufacturing a selective band-pass filter/emitter, the low-pass block BPB blocks the wavelengths above the bandgap characteristic of the resonator block BR. The low-pass block can consist of different periodicity groups the individual bandgaps of which overlap (see FIGS. 6A and 6B). Each of the periodicity groups can comprise between 3 and 30 modulations. The periodicity groups may be replaced with a concatenation of 5 to 50 periods the length of which increases or decreases linearly with a variation of less than 2% between consecutive periods. Both configurations can be seen in FIG. 5.

In some embodiments, two or more low-pass groups GPB can be compacted into a single low-block BPB by alternating as many modulations of a different period as there are blocks to be implemented. To that end, an AB-AB . . . AB distribution can be followed, in the case of two-pass groups, ABC-ABC- . . . -ABC in the case of three, and so on and so forth. In this case, the variation may be greater than 2%. Likewise, an aperiodic distribution, i.e., ABCDEFG . . . , without repetition, could be followed.

High-Pass Block:

This high-pass block BPA has the same characteristics as the low-pass block BPB, but in this case the periods are such that they block the wavelengths that are smaller than those of the region of interest. Therefore, they are shorter than those of the low-pass block BPB.

PB-PA Blocks:

Three ways of obtaining high-pass blocks BPA or low-pass blocks BPB have been distinguished up until now. First, by means of modulations with one and the same period. Second, by means of linearly increasing or decreasing period modulations. Third, by means of alternating modulations of a different periodicity. In the three cases, the choice of the periods is such that the wavelengths above the bandgap (low-pass block BPB) or below the bandgap (high-pass block BPA) are blocked. However, if alternating or non-alternating periods that are different enough from one another are chosen in the third option, high and low bands are successfully blocked in one and the same block. This low-pass block/high-pass block, or BPB-PA, is of special interest in the case of emitters, although it can also be used in the case of filters.

Resonator Block:

This consists of two or more periodicity groups GR1, GR2, with a difference in the periods that is less than 20% between consecutive groups, and a resonant cavity CR between resonator groups. The configuration is similar to the structure of resonator groups reported in [2] for a resonance peak or in [6] for two resonance peaks. These resonator groups GR1, GR2, particularly, consist of 3 or more periods, with the resonant cavity CR being located in the middle. In some embodiments, the resonant cavity CR consists of resonators $m\lambda/4$ with the same characteristics as those described for the antireflective layers RAR. In any case, the resonant cavity CR can comprise resonators $m\lambda/4\pm25\%$.

Thin Absorbent Coatings:

Certain spectral regions can also be removed by the use of thin material deposits. These deposits are made by controlled atmosphere thermal growth, atomic layer deposition, or electrodeposition, and internally coat the pores.

Figure 9:
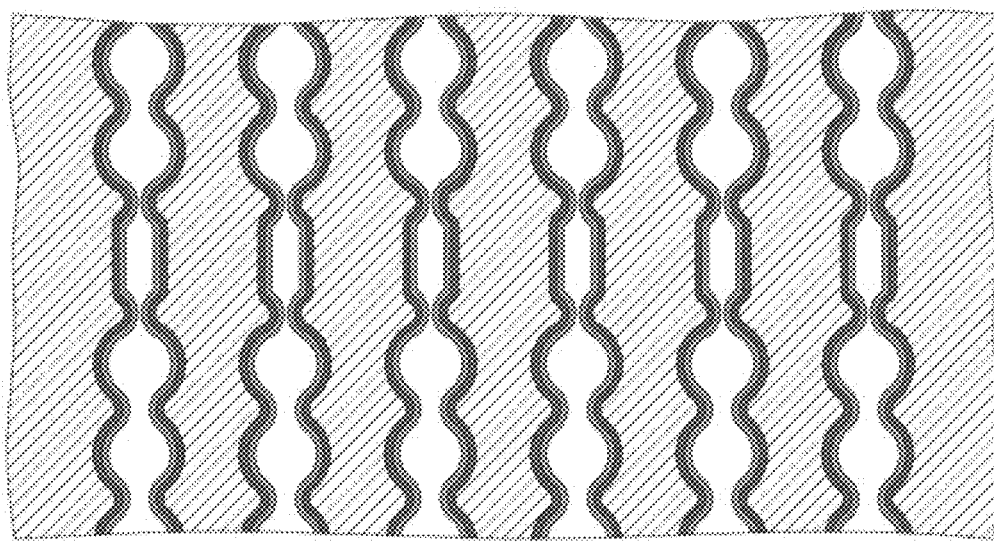
FIG. 9 schematically illustrates the internal coating of the pores to increase absorption in the bands, according to an embodiment of the present invention.

FIG. 9 shows an example of the internal coating of the pores. The thicknesses of the layers are preferably less than 0.2p, where p is the minimum separation between attached pore centers. This mechanism is based on the capability of photonic crystals manufactured of macroporous silicon to allow the deposit of thin layers in the inner region of the pores and concentrate the electromagnetic field in same. High interaction is thereby achieved with the deposited material despite the fact that it has smaller dimensions. The deposited materials have an intrinsic absorption in certain regions of the spectrum, which maximizes absorption, making it possible to reduce the deposited thicknesses by more than 50 times compared to standard multilayer filter configurations [5].

In the case of using these layers, the effective refractive index, $n_{eff}$, of the antireflective layers RAR should be recalculated by taking a weighted average of the refractive indices according to the volume occupied by the silicon and the deposited material.

FIG. 10 shows the optical response of the filter with the internal coating of the pores.

FIGS. 11A and 11B show another block diagram of the blocks forming the band-pass filter (FIG. 11A) and the optical response thereof (FIG. 11B). In this embodiment, the band-pass filter (selective emitter) includes a high-pass block BPA, a low-pass block BPB, a resonator block BR, an antireflective region RAR of the air/silicon interface, and two antireflective regions RAR of the interface between blocks. The blocks can be interchanged; however, the situation of groups with larger periods at the beginning of the pore will be preferred. Furthermore, in FIG. 11B two layers of silicon oxide and $Si_3N_4$, e.g. 20 nm, are used to remove the upper bands.

The scope of the present invention is defined in the attached claims.

What is claimed is:

1. An optical band-pass filter with blocked sidebands, comprising a photonic crystal structure based on macroporous silicon having a series of pores defined in the photonic crystal structure, wherein the photonic crystal structure includes:
    a resonator block, comprising at least two periodicity groups between which there is a resonant cavity, the resonant cavity being adapted to provide a resonance peak in a center of a non-transmitting frequency band of the resonator block; and at least one of:
    a high-pass block, adapted to block wavelengths below said non-transmitting frequency band; or
    a low-pass block, adapted to block wavelengths above said non-transmitting frequency band.

2. The filter according to claim 1, wherein the photonic crystal structure comprises a low-pass block and a high-pass block.

3. The filter according to claim 1, wherein the low-pass block and/or the high-pass block each comprises at least two periodicity groups whose individual non-transmitting frequency bands overlap.

4. The filter according to claim 3, wherein each of the at least two periodicity groups of the low-pass block and/or the high-pass block has a number of periods ranging between 3 and 30 modulations.

5. The filter according to claim 4, wherein the periods of the periodicity groups of the high-pass block are shorter than the periods of the periodicity groups of the low-pass block.

6. The filter according to claim 1, wherein the photonic crystal structure further comprises an antireflective layer located above at least one of the resonator block, high-pass block, or low-pass block.

7. The filter according to claim 6, wherein the antireflective layer comprises an optical length of an odd multiple of $\lambda/4$, wherein $\lambda$ is a center wavelength of the optical band-pass filter.

8. The filter according to claim 6, wherein the antireflective layer is located at an air/silicon interface of the photonic crystal structure and comprises a topology with a straight cylinder-shaped profile of radius R or a cone-shaped profile, an initial radius R of which being larger than a radius of a first modulation and decreasing following a linear or quadratic trend.

9. The filter according to claim 8, wherein the antireflective layer(s) is/are located between the resonator block, high-pass block, and/or low-pass block, and comprise(s) a topology with a straight cylinder-shaped profile of radius R, with a transition zone at each end of said straight cylinder.

10. The filter according to claim 1, wherein the pores include an internal coating of an absorbent material.

11. The filter according to claim 10, wherein the absorbent material comprises $TiO_2$, $SiO_2$, or $Si_3N_4$.

12. The filter according to claim 10, wherein said internal coating has a thickness of less than 0.2p, where p is a minimum separation between attached pore centers.

13. The filter according to claim 1, wherein an arrangement of the resonator block, high-pass block, and/or low-pass block in the photonic crystal structure is interchangeable.

14. The filter according to claim 1, wherein the resonant cavity consists of a resonator of an optical length of an odd multiple of $\lambda/4$, wherein $\lambda$ is a center wavelength of the optical band-pass filter.

15. The filter according to claim 1, wherein the photonic crystal structure is one-dimensional or three-dimensional.

16. The filter according to claim 7, wherein the antireflective layer is located at an air/silicon interface of the photonic crystal structure and comprises a topology with a straight cylinder-shaped profile of radius R or a cone-shaped profile, an initial radius R of which being larger than a radius of a first modulation and decreasing following a linear or quadratic trend.

* * * * *